(12) United States Patent
Frazier et al.

(10) Patent No.: US 8,478,788 B1
(45) Date of Patent: Jul. 2, 2013

(54) CENTRALIZED INFORMATION TECHNOLOGY RESOURCES ANALYSIS SYSTEM

(75) Inventors: Jonathan W. Frazier, Douglasville, GA (US); Kenneth M. Halley, Suwanee, GA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 12/706,368

(22) Filed: Feb. 16, 2010

Related U.S. Application Data

(63) Continuation of application No. 11/164,169, filed on Nov. 13, 2005, now abandoned.

(60) Provisional application No. 60/522,858, filed on Nov. 14, 2004.

(51) Int. Cl.
*G06F 17/30* (2006.01)

(52) U.S. Cl.
USPC .......................................................... 707/802

(58) Field of Classification Search
USPC ............ 707/802; 705/37, 38, 2, 80; 709/223, 709/229
See application file for complete search history.

(56) References Cited

U.S. PATENT DOCUMENTS

| | | | |
|---|---|---|---|
| 5,644,727 A * | 7/1997 | Atkins | 705/40 |
| 7,305,351 B1 * | 12/2007 | Bechhofer et al. | 705/7.28 |
| 7,596,523 B2 * | 9/2009 | Sobel et al. | 705/36 R |
| 7,640,201 B2 * | 12/2009 | Chalermkraivuth et al. | 705/36 R |
| 7,668,773 B1 * | 2/2010 | Pruitt | 705/36 T |
| 7,873,567 B2 * | 1/2011 | Eder | 705/38 |
| 2005/0071266 A1 * | 3/2005 | Eder | 705/38 |

* cited by examiner

*Primary Examiner* — Sheree Brown
(74) *Attorney, Agent, or Firm* — Campbell Stephenson LLP

(57) ABSTRACT

SecureFusion is a knowledge management system that integrates asset and risk management of Information technology resources for enterprises and provides metrics for the holistic representation of voluminous technical data. Integration of risk management, security operations and asset management creates an efficient and effective synergistic solution. SecureFusion is a solution that enables enterprises to perform real-time high speed operations research of Information Technology assets and security risks in a process-driven methodology. SecureFusion is comprised of modular, scalable components, utilizing web services to communicate with a centralized SecureFusion Portal. The myriad of data elements discovered and analyzed are converted into a knowledge-based information system. The knowledge-based system and portal provide real-time, dynamic reporting and graphic portrayal of management information for the enterprise. Metrics are used to provide a graphical global security status and scorecard. The security and asset data is summed up to provide key metrics for business leaders to understand and act on the data without having to understand the nuance of every bit and byte. The knowledge-based information system facilitates a hierarchical view of the enterprise assets and risk management data. Management is provided a score card on business unit vulnerabilities and can assign resources for corrective action as appropriate to the priority.

11 Claims, 4 Drawing Sheets

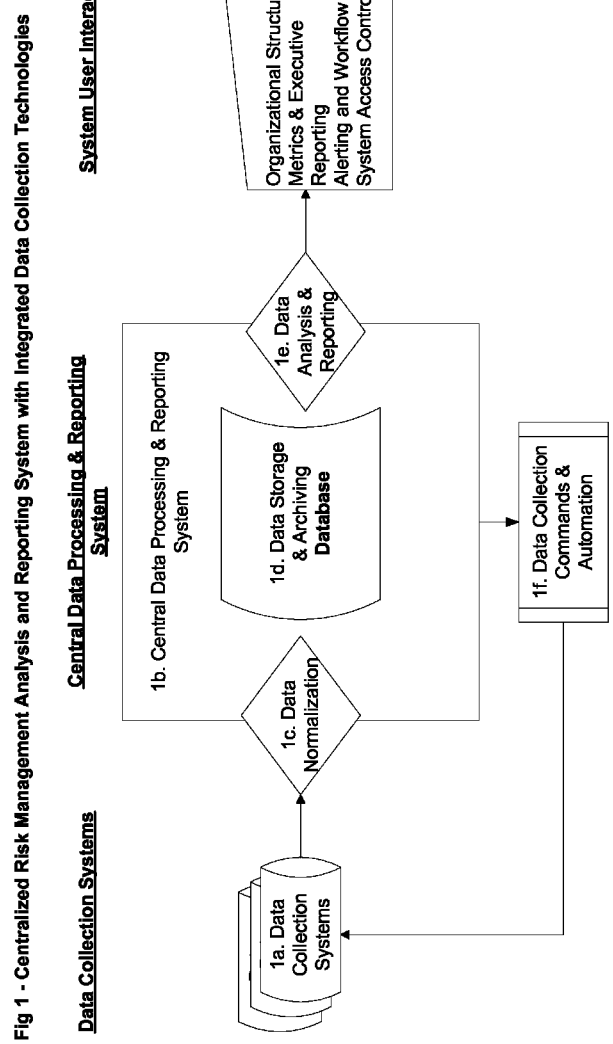

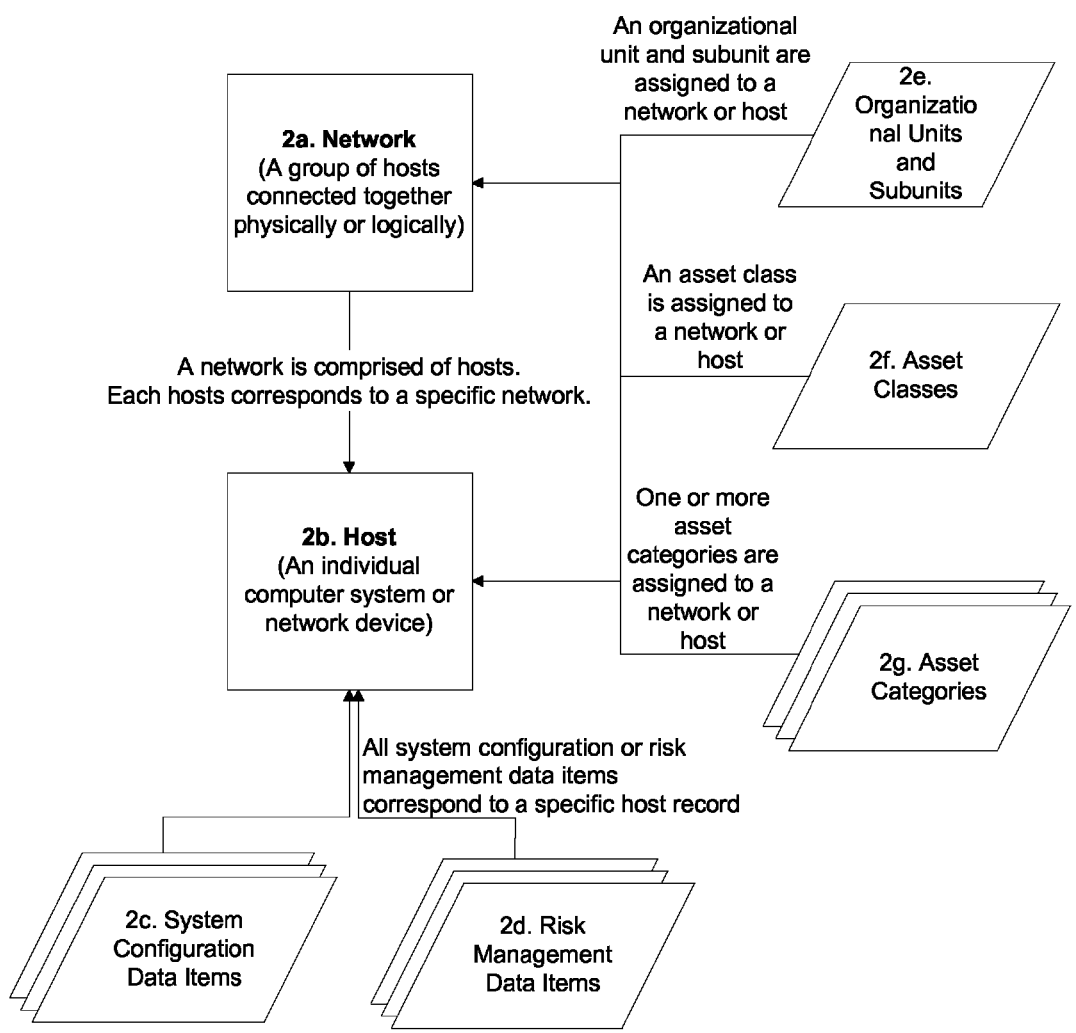
Fig 2 - Data Hierarchy for Assets Types, Asset Classes, Asset Categories and Organizational Structures

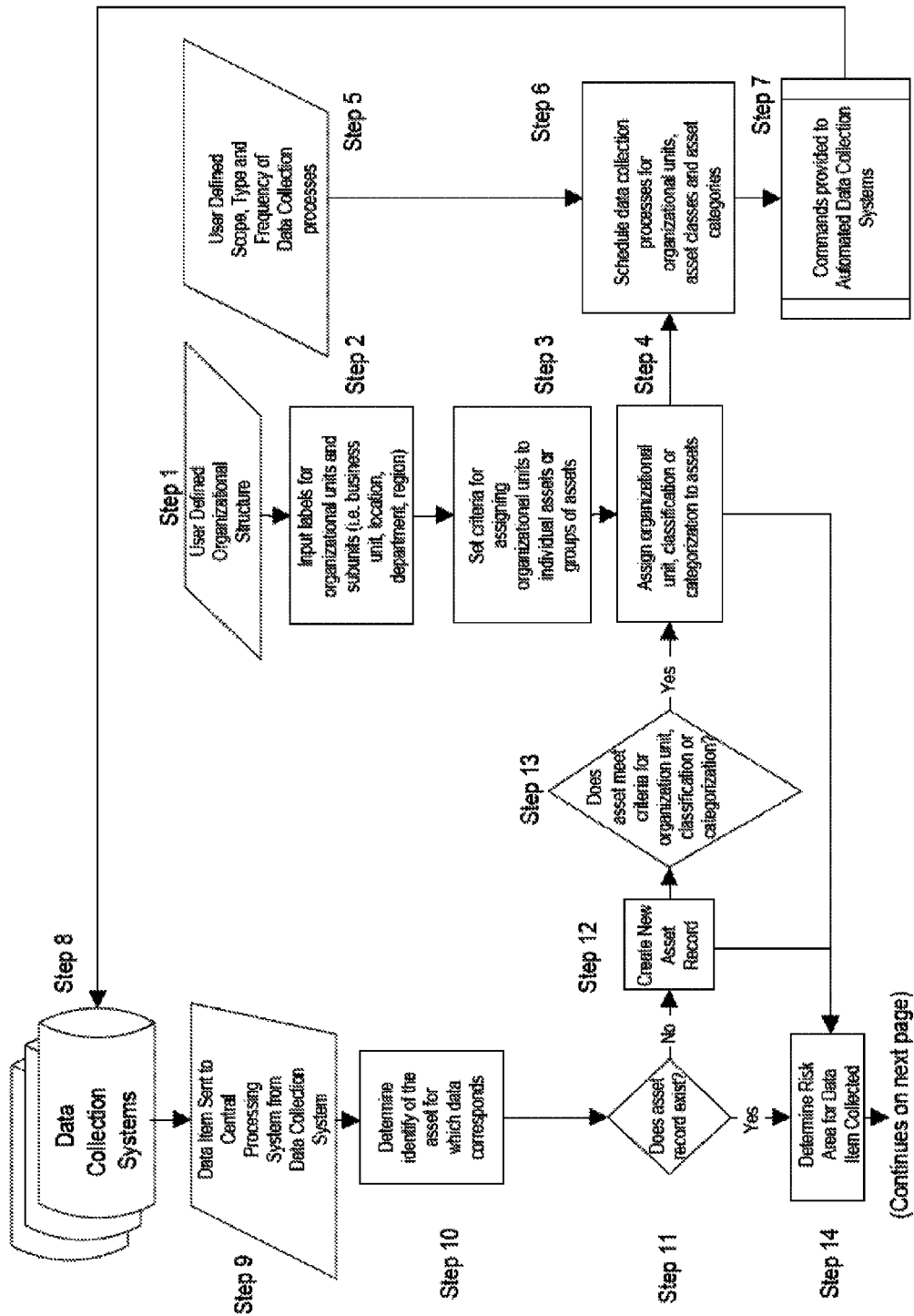
Figure 3. Defining an organizational structure, asset classification, asset categorization and performance metrics schema in a central data processing system, by which to measure information Technology risks and automate information technology risk management processes.

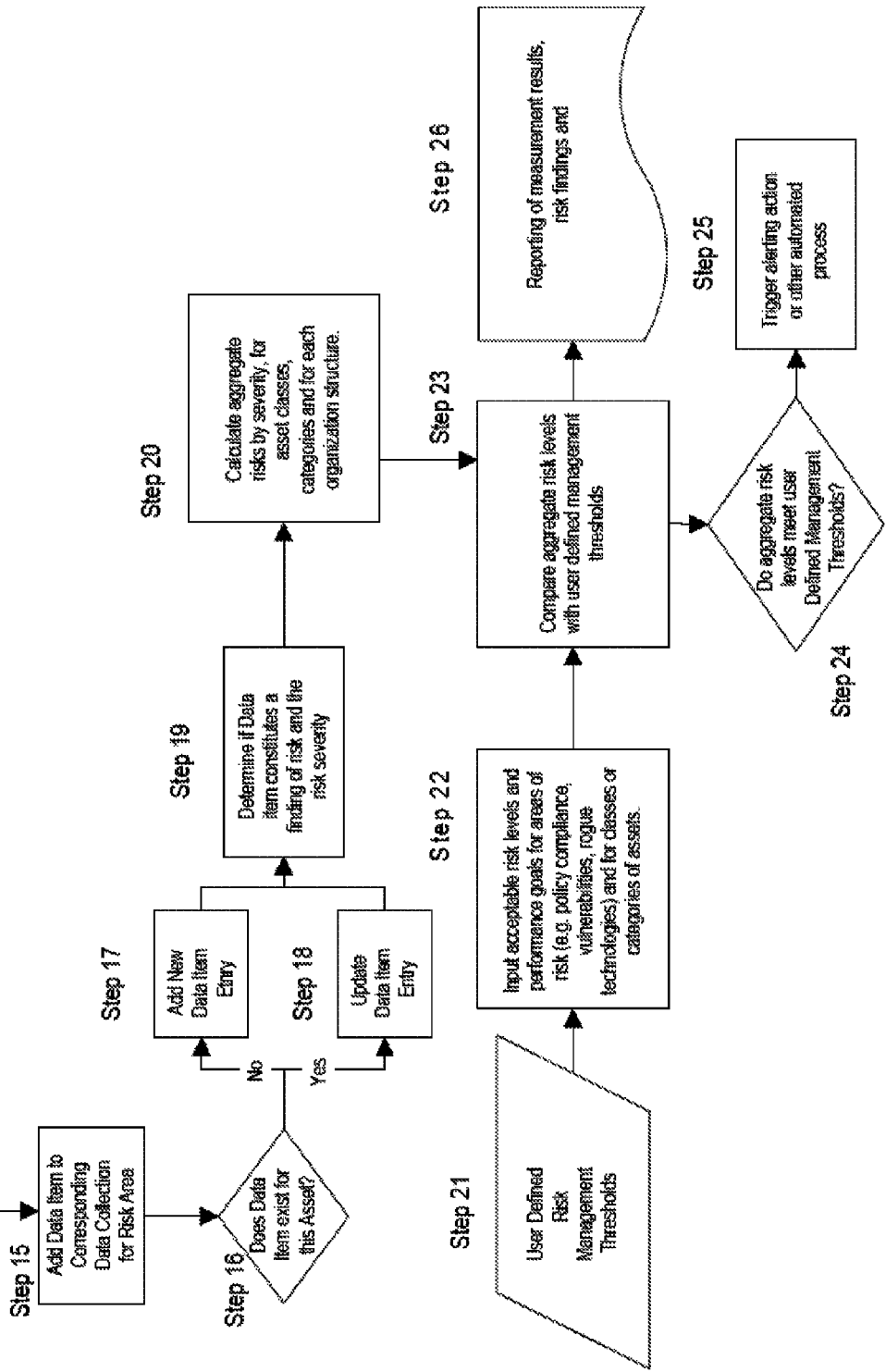

CENTRALIZED INFORMATION TECHNOLOGY RESOURCES ANALYSIS SYSTEM

CROSS-REFERENCE TO RELATED APPLICATIONS

This application is a continuation of U.S. patent application Ser. No. 11/164,169, filed on Nov. 13, 2005 now abandoned, entitled "Integration of Information Technology Asset and Risk Management Information Provides an Efficient and Effective, Synergistic Solution for Reporting, Measurement, Management, and Safeguarding of Resources for Enterprises," and naming Jonathan W. Frazier and Kenneth M. Halley as the inventors. This application is assigned to Symantec Corporation, the assignee of the present invention, and is hereby incorporated by reference in its entirety and for all purposes as if completely and fully set forth herein. This application also claims the benefit of provisional U.S. Patent Application No. 60/522,858, filed on Nov. 14, 2004, entitled "Integration of Information Technology Asset and Risk Management Information Provides an Efficient and Effective, Synergistic Solution for Reporting, Measurement, Management, and Safeguarding of Resources for Enterprises," which is hereby incorporated by reference in its entirety and for all purposes as if completely and fully set forth herein.

FEDERALLY SPONSORED RESEARCH

Not Applicable

SEQUENCE LISTING OR PROGRAM

Not Applicable

BACKGROUND OF THE INVENTION

1. Field of Invention

This invention generally relates to processes that enable the reporting, measurement, management, and safeguarding of information technology resources through a knowledge-management system.

2. Prior Art

A plethora of commercial software programs are available to identify security threats, perform risk assessments, determine compliance with policies, and analyze vulnerabilities for individual computers and networks. However, these programs produce a large volume of technical data without the context of the other areas of asset and risk management or any way to gain a holistic perspective on what this data represents. Because of the technical nature of the information solutions have taken a very granular approach to reporting. These basic issues have presented several difficult problems for people managing information technology resources, especially in large enterprises with thousands of computer, printers, networks devices, etc.

One critical issue is the gap of knowledge between technicians and business leaders. Experienced technicians can understand the information at a granular level but have no way to get a holistic view of the information. Business decision makers need a holistic view but have neither the technical experience to understand the granular information from each computer and no way to get an accurate holistic perspective from their technicians. This has produced an information technology environment that is difficult to manage without the availability of empirical holistic data on enterprise information technology resources.

Another important issue is that the nature of data that is summarized by the technicians is anecdotal, unrepeatable, and unreliable. This leads to many faulty decisions about problems, root causes, opportunity, risk and the prioritization of resources.

These limitations have produced a climate where information technology risk management issues are managed by subjective analysis instead of empirical metrics. These disadvantages will become even more pronounced as the amount of risk management increases as information technology resources such as computer and other devices become more automated, ubiquitous and embedded in operations, business process, and management.

OBJECTS AND ADVANTAGES

FIG. 1 shows an overview of the architecture of the solution. The different aspects of asset and risk management are measured through the integration of a variety of data collection systems (FIG. 1a). Data is normalized (FIG. 1c) from each data collection system in these areas and used to produce the metrics that represent the holistic view of this typically voluminous data. Accordingly, several objects and advantages of the invention are:

Statistical representation of voluminous technical data into metrics for empirical analysis, non-technical reporting, internal and external benchmarking, trending and historical analysis, root cause analysis, resource prioritization, and strategy; and Integration of asset and risk management information into a centralized knowledge management system for greater efficiency, synchronization of data, greater access, holistic representation across diverse areas, interactive processes between the different areas of asset and risk management, and internal company collaboration.

In our working systems, we have been able to centralize asset and risk management for companies and provide a deeper empirical understanding of how the information technology environment is being managed to business decision-makers and executives. Other objects and advantages will become apparent from a consideration of the ensuing description and drawings.

SUMMARY

SecureFusion is a knowledge management system that integrates asset and risk management of information technology resources for enterprises and provides holistic metrics for the management of these areas. Integration of risk management, security operations, and asset management creates an efficient and effective synergistic solution. SecureFusion is a solution that enables enterprises to perform real-time high speed operations research of information technology assets and risk information in a process-driven methodology.

SecureFusion is comprised of modular, scalable components, utilizing web services to communicate with a centralized SecureFusion web-based portal. The myriad of data elements discovered and analyzed are converted into a hierarchical knowledge-based information system. The knowledge-based system and portal provide real-time, dynamic reporting and graphic portrayal of management information for the enterprise. Metrics are used to provide a graphical global security status and scorecard. The risk and asset data is used to calculate metrics by specific formulas in the following basic areas:

Rogue Technology

Vulnerability Management

Risk Remediation

Policy Management

These metrics are formulated to allow business leaders to understand and act on the data without having to understand the nuance of every bit and byte. The knowledge-based information system facilitates a hierarchical view of the enterprise assets and risk management data. Vulnerabilities, policy violations, rogue technology and other risk issues are automatically tracked within the portal as they are assigned and remedial action initiated. Management is provided a scorecard on business unit risk issues and can assign resources for corrective action as appropriate to the priority.

DRAWINGS

FIGS.

FIG. 1 shows the Centralized Risk Management Analysis and Reporting System with Integrated Data Collection Technologies.

FIG. 2 shows the Data Hierarchy for Assets Types, Asset Classes, Asset Categories and Organizational Structures.

FIG. 3 shows the process for Defining an organizational structure, asset classification, asset categorization and performance metrics schema in a central data processing system, by which to measure Information Technology risks and automate information technology risk management processes.

DETAILED DESCRIPTION

Preferred Embodiment—FIGS.

SecureFusion takes data feeds from asset and risk management sources and correlates the information to an Information Technology assets inventory. Asset and risk management data is presented and correlated with other host and network information in the SecureFusion web-based portal to provide a complete picture of the current security state for the enterprise.

The asset inventory is constructed with a hierarchical design. The top of the hierarchy is referred to as the global view. It is the top level of a management structure within the portal by which all asset and risk management data can be reported and managed. This structure is commonly aligned with an organizational structure (FIG. 2e) by business units, but can be organized by geography, technology or other delineation. Beneath the global view are two hierarchical layers of organization, referred to as units and sub-units. Units and sub-units can be named, added, deleted, and assigned individual attributes.

Networks are the next layer in the assets inventory hierarchy (FIG. 2a). They comprise the logical interconnection of hosts (computers or network devices). Networks may also be named, added, deleted, and assigned individual attributes. Knowledge of technology networks results in logical groupings of assets within the knowledge management system. Therefore, management and analysis of those assets can be applied in an efficient manner, by network.

Hosts are the next layer in our assets inventory hierarchy (FIG. 2b). They comprise at least one network addressable interface on a computer or other network devices. Hosts may be named, added, deleted, and assigned individual attributes. Knowledge of the presence, or removal, of hosts within the enterprise assets provides for automated processes to update enterprise information risk management data related to each host.

System configuration data (FIG. 2c) and risk management data (FIG. 2d) are the final layer in our assets inventory hierarchy. They comprise a set of programs and specific settings on the host. Knowledge of these technical details fosters the distribution and reporting of risk management data to application owners or functional areas.

Asset inventory information is input into SecureFusion through automatic updating from a variety of data collection systems, discovery applications, importation of data from existing data stores, etc. Web services are used to provide an open interface to push data into the asset inventory.

The asset inventory provides the basis for correlation of other risk management information. All new risk management information about networks, hosts, and applications is correlated to its appropriate asset providing context to the information and enabling new processes that were previously unavailable. The alignment of assets with business units or other organizational structures, results in an ability to view and manage risk management data according to the organizational structure. This ability transforms a homogenous network view of assets (technology) into a business oriented view (people and process) for enterprise management.

Other new processes enabled by providing a contextual view of risk management information are:

Automated risk and asset reporting aligned with organization structures

Rapid prioritization and distribution of risk management information to owners and stakeholders Identification of rogue technologies (i.e. technologies that are not approved, incorporated into standard IT practices, or unknown to the IT organization)

Violation of corporate IT standards and policies

Categorized reporting through assignment of assets (FIG. 2g)

Classification reporting through assignment of assets (FIG. 2f)

Prioritization of risk management issues

A "global" view of risk management information through metrics

Graphical and statistics based reporting on all risk management data to present multi-dimensional views of the data Enterprise-wide management of information technology risks including service level agreements, policy establishment, and monitoring.

Reporting, trending and tracking of global remediation efforts

One of the more powerful advantages of this contextual view of risk management information is the summation of previously voluminous and highly technical data into easily understandable metrics. SecureFusion incorporates these metrics as a way of providing non-technical users and management with a way to measure the state of information security in an enterprise, make goals, track progress, and provides objective criteria. SecureFusion currently incorporates three algorithms to provide these metrics.

Vulnerability metrics are calculated as a coefficient per risk level. The total hosts with a vulnerability at the specified risk level are divided by the total hosts in the asset inventory population. This coefficient can be shown "globally" or broken down by unit or subunit. It also may be expressed as a percentage.

Rogue technology metrics are calculated as a coefficient per technology type (network, host, or application). The total technology units (network, host, or application) designated as rogue are divided by the total population of technology units in the asset inventory. This coefficient can be shown "globally" or broken down by unit or subunit. It also may be expressed as a percentage.

Policy compliance metrics are calculated as a coefficient per policy. The total hosts non-compliant with a policy control are divided by the total hosts within the scope of the policy control. The policy compliance metrics is the represented as an average of all the policy controls compliance for each policy. This coefficient can be shown "globally" or broken down by unit or subunit. It also may be expressed as a percentage. All risk management information is converted to tasks to allow for tracking of remediation efforts. Remediation metrics are calculated as an average age per task type (vulnerability, rogue technology, etc.). The total task types (vulnerability, rogue technology, etc.) designated as incomplete are averaged. This average is expressed in days.

These metrics are globally measured against set goals, or thresholds, in each area, referred to as service levels, to provide reporting and alerting if a metric falls below a predetermined level.

Workflow is an integral part of the functionality of the portal providing means to assign remediation tasks, filter data, authorize technologies, blacklist devices, etc. to significantly ease the burden of managing the information.

OPERATION

Preferred Embodiment—FIGS.

A preferred embodiment of the steps involved in the invention is illustrated in FIG. 3. FIG. 3 depicts the processes required to build and maintain the hierarchical knowledge management system.

Step 1 is the input of a user-defined organizational structure into the system. This organization structure is organized into units and sub-units which the user can attach labels to such as business unit, geography, location, city, etc. in Step 2. This provides business-contextual information to the data. Step 3 involves the user designating criteria for assigning assets (networks or hosts) to these units and sub-units. In Step 4 the criteria will be applied to existing network or hosts in the asset inventory. During Step 4 a user may also assign assets to categories or classifications that can cross the hierarchy of unit/sub-unit. From this point on all information about an asset and the asset's designated children (in the hierarchy) will be assigned the business-context information of unit/sub-unit and the appropriate user designated labels in addition to any category or classifications that are also applied to the asset.

Step 5 may or may not occur before Step 1. It is not dependant on Step 1 to be executed. Step 5 allows the user to define the scope, type and frequency of the data collection from the data sources. Step 6 involves the scheduling of the data collection as determined in Step 5 and typically involves organizational structure, previous asset inventory data collection, categorized assets, and classified assets. This is a great advantage because the process can begin with the previous knowledge collected by the other processes. An example would be the scheduling of a vulnerability scan of all hosts within a certain business unit and only hosts assigned selected categories. The alignment of the previously gathered information results in an intelligent process that can be customized to the users need. Step 7 sends the commands scheduled in the process from a queue to the data collections systems, e.g. a vulnerability scanner, asset discovery scanner, etc.

Step 8 is the beginning of an iterative process that allows the data in the knowledge management system to be updated and current. These data collections systems may gather a variety of asset or risk management data to be brought back into the system when complete.

Step 9 depicts the process of receiving the asset or risk management data from the data collection systems. This information is transmitted using web services to the centralized system, but could be transmitted in a variety of ways.

Step 10 correlated the incoming data with the hierarchy in the system. The data will be attached to a particular asset usually a host. If the data relates to a network than the network must be explicitly specified by an ID number or network number. If the data is a host then the information must be normalized to correspond to the existing host data. The data must contain unique identifiers to align it with an existing host record or to determine if a new record must be created. These unique identifiers are dependant on the data collected but can be an ID number, IP address, MAC address, hostname, etc.

Step 11 determines if the asset exists in the asset inventory. If the asset does not exist the process will move to Step 12. If the asset does exist the process will move to Step 14.

Step 12 involves the creation of a new asset record.

Step 13 determines whether the new asset should be assigned unit/sub-unit, category, classification or other information based on its position in the asset inventory hierarchy. If its parent contains this information and is designated to propagate the information to its children then the new asset will take on this contextual information.

Step 13 then proceeds to Step 4 for the assignment of applicable hierarchical information to the child. Step 4 would then proceed directly to Step 14 after the creation of a new asset record.

Step 14 identifies which risk area that the collected data applies to for the asset. Some examples of risk areas are vulnerability management, rogue technology, configuration management, policy compliance, threat management, etc.

Step 15 adds the data item to a collection for the risk area identified. This can begin an iterative process for multiple data items until all data associated with the asset is updated in the knowledge management system.

Step 16 determines whether the data item or collection currently exists in the system. If the data item exists, the host information is updated in Step 18. If the data item does not exist, the data is added to the host information.

Step 19 is the quantification of risk severity for the data. This is based on system or user defined criteria from Step 21 which is then entered into the system in Step 22. These user defined criteria are measured against the aggregate metrics that are calculated in Step 20. Metrics for specified areas are calculated as follows:

Vulnerability metrics are calculated as a coefficient per risk level. The total hosts with a vulnerability at the specified risk level are divided by the total hosts in the asset inventory population, Rogue technology metrics are calculated as a coefficient per technology type (network, host, or application). The total technology units (network, host, or application) designated as rogue are divided by the total population of technology units in the asset inventory, Policy compliance metrics are calculated as a coefficient per policy. The total hosts non-compliant with a policy control are divided by the total hosts within the scope of the policy control. The policy compliance metrics is the represented as an average of all the policy controls compliance for each policy, and All risk management information is converted to tasks to allow for tracking of remediation efforts. Remediation metrics are calculated as an average age per task type (policy compliance, vulnerability, rogue technology, etc.). The total task types (policy compliance, vulnerability, rogue technology, etc.) designated as incomplete are averaged.

Step 23 compares the metrics calculated in Step 20 with user defined criteria in Step 22. These comparisons form the basis to report on the metrics and actions taken either to report on the information and whether the user defined criteria was met in Step 26 or to determine whether alert thresholds are met in Step 24 and send an alert to another system such as e-mail or a pager for follow-up action.

The metrics reporting generated in Step 26 is one of the most important outcomes and advantages of this process because it allows for the summarization of very technical data into scores that can be easily understood by a non-technical business decision maker who can then base decisions on prioritization, strategic goals, etc. on the empirical measurement of the technical environment.

CONCLUSION, RAMIFICATIONS, AND SCOPE

Accordingly, the reader will see that, according to the invention, the method provides for significantly better management of information technology asset and risk information through the integration, centralization, and metrics based approach described in the process.

While the above description contains many specificities, these should not be construed as limitations on the scope of the invention, but as exemplifications of the presently preferred embodiments thereof. Many other ramifications and variations are possible within the teachings of the invention.

Thus the scope of the invention should be determined by the appended claims and their legal equivalents, and not by examples given.

What is claimed is:

1. A method comprising:
building a hierarchical knowledge management system, wherein
said hierarchical knowledge management system is configured to
maintain asset information, wherein
said asset information comprises information regarding one or more assets, and
risk management information, and
said building said hierarchical knowledge management system comprises
defining a hierarchical structure, wherein
said hierarchical structure represents an organizational structure of a business,
providing a user-defined scheduling process, wherein
said user-defined scheduling process facilitates repeated collection of said risk management information,
setting a risk management threshold for one or more areas of risk, wherein
said one or more areas of risk comprise at least one of
policy compliance,
vulnerabilities,
policy compliance remediation, or
vulnerability remediation,
receiving said risk management information, wherein
said risk management information is collected from one or more data collection systems,
assigning said risk management information to said one or more of said assets,
calculating an aggregate risk metric, wherein
said calculating said aggregate risk metric is performed using said risk management information, and
said calculating said aggregate risk metric comprises calculating a risk metric for each of said one or more assets,
comparing said aggregate risk metric with said risk management threshold, wherein
said comparing comprises
updating said asset information, and
said updating said information comprises
determining whether a data item exists in said asset information, and
creating said data item in said asset information, if said data item does not exist in said asset information, and
reporting a result of said comparing.

2. The method of claim 1, wherein
said hierarchical structure further represents
an asset category, and
one or more classifications of said asset information.

3. The method of claim 2, wherein said calculating said aggregate risk metric for said each of said one or more assets comprises:
calculating a risk metric for said asset category and for said one or more classifications of said asset information.

4. The method of claim 1, wherein said hierarchical structure comprises a plurality of layers, and further comprising:
comparing said data item to predetermined criteria for each layer of said hierarchical structure, wherein
said each layer of said hierarchical structure comprises said predetermined criteria, and
said predetermined criteria comprises at least one of
an organizational structure,
an asset type,
an asset class, or
an asset category, and
assigning said data item to a specific layer of said hierarchical structure, wherein
said assigning said data item is based on said predetermined criteria.

5. The method of claim 1, wherein said determining further comprises:
selecting a reliability of identification of an asset corresponding to said data item, wherein
said selecting selects from one of media access control (MAC) address, internet protocol (IP) address, hostname, or asset identification number.

6. A system comprising:
a processor;
a data collection system, wherein
said data collection system is communicatively coupled to said processor, and
said data collection system is configured to collect risk management information;
a central data processing system, wherein
said central data processing system is communicatively coupled to said processor,
said central data processing system is communicatively coupled to receive said risk management information from said data collection system,
said central data processing system is configured to analyze said risk management information, and report a result of said analysis, said central data processing system is configured to analyze said risk management information by virtue of being further configured to
define a hierarchical structure, wherein
said hierarchical structure represents an organization structure of a business,
said hierarchical structure is configured to store asset information by virtue of comprising a plurality of layers,
said asset information comprises
information regarding one or more assets, and
said risk management information, and
a top layer of said plurality of layers is configured to be accessed via a web-based portal, such that said asset information is available via a web services interface,
set a predetermined risk management threshold for one or more areas of risk, wherein
said one or more areas of risk comprise at least one of
policy compliance,
vulnerabilities,
policy compliance remediation, or
vulnerability remediation,
provide a user-defined scheduling process, wherein
said user-defined scheduling process facilitates repeated collection of said risk management information,
assign said risk management information to said one or more of said assets,
calculate an aggregate risk metric, wherein
said aggregate risk metric is calculated using said risk management information, and
said aggregate risk metric is calculated by calculating a risk metric for each of said one or more assets, and
perform a comparison of said aggregate risk metric and said risk management threshold; and
a reporting system, wherein
said reporting system is configured to
report a result of said comparison, and
provide said access to said web-based portal.

7. The system of claim 6, wherein said top layer is further configured to provide an open interface to push data into said hierarchical structure.

8. The system of claim 6, wherein said central data processing system is further configured to
update said asset information, wherein
said central data processing system is configured to update said asset information by virtue of being configured to
determine whether a data item exists in said asset information, and
create said data item in said asset information, if said data item does not exist in said asset information,
compare said data item to predetermined criteria for each layer of said hierarchical structure, wherein
said each layer of said hierarchical structure comprises said predetermined criteria, and
said predetermined criteria comprises at least one of
an organizational structure,
an asset type,
an asset class, or
an asset category, and
assign said data item to a specific layer of said hierarchical structure, wherein
said data item is assigned based on said predetermined criteria.

9. The method of claim 1, further comprising:
providing a view of said asset information via a web services interface.

10. The system of claim 6, wherein
said aggregate risk metric is calculated by calculating a risk metric for an asset category and for one or more classifications of said asset information.

11. The method of claim 1, wherein said comparing further comprises:
comparing said data item to predetermined criteria for each layer of said hierarchical structure, wherein
said each layer of said hierarchical structure comprises said predetermined criteria, and
said predetermined criteria comprises at least one of
an organizational structure,
an asset type,
an asset class, or
an asset category, and
assigning said data item to a specific layer of said hierarchical structure, wherein
said assigning is based on said predetermined criteria.

* * * * *